United States Patent
Glavind et al.

(10) Patent No.: US 11,248,583 B2
(45) Date of Patent: *Feb. 15, 2022

(54) RELATING TO A YAW SENSOR FOR A WIND TURBINE

(71) Applicant: VESTAS WIND SYSTEMS A/S, Aarhus N (DK)

(72) Inventors: Lars Glavind, Randers Nv (DK); Ib Svend Olesen, Randers (DK); Morten Thøgersen, Hinnerup (DK); Kristian Kiib, Skødstrup (DK); Johnny Nielsen, Svenstrup J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 462 days.

This patent is subject to a terminal disclaimer.

(21) Appl. No.: 16/076,648

(22) PCT Filed: Feb. 10, 2017

(86) PCT No.: PCT/DK2017/050036
§ 371 (c)(1),
(2) Date: Aug. 8, 2018

(87) PCT Pub. No.: WO2017/137051
PCT Pub. Date: Aug. 17, 2017

(65) Prior Publication Data
US 2019/0048848 A1    Feb. 14, 2019

(30) Foreign Application Priority Data
Feb. 12, 2016   (DK) ............... PA201670077

(51) Int. Cl.
*F03D 7/02*    (2006.01)

(52) U.S. Cl.
CPC .......... *F03D 7/0204* (2013.01); *F03D 7/0264* (2013.01); *F05B 2260/845* (2013.01); *F05B 2270/329* (2013.01); *F05B 2270/809* (2013.01); *Y02E 10/72* (2013.01)

(58) Field of Classification Search
CPC ..... F03D 7/0204; F03D 7/0264; Y02E 10/72; F05B 2260/845; F05B 2270/329; F05B 2270/809
See application file for complete search history.

(56) References Cited

U.S. PATENT DOCUMENTS

| | | |
|---|---|---|
| 4,545,728 A | 10/1985 | Cheney, Jr. |
| 5,278,773 A | 1/1994 | Cousineau |

(Continued)

FOREIGN PATENT DOCUMENTS

| | | |
|---|---|---|
| CN | 101117945 A | 2/2008 |
| CN | 102213181 A | 10/2011 |

(Continued)

OTHER PUBLICATIONS

Chinese Office Action for Application No. 201780010805.6 dated Sep. 3, 2019.

(Continued)

*Primary Examiner* — David E Sosnowski
*Assistant Examiner* — Hakeem M Abdellaoui
(74) *Attorney, Agent, or Firm* — Patterson + Sheridan, LLP

(57) ABSTRACT

A yaw sensor for a wind turbine comprises a plurality of rotary switches, each configured to be coupled to a yaw drive gearbox of a wind turbine nacelle, the rotary switches each being operable to activate and deactivate respective associated electrical contacts in dependence on an amount of yaw rotation of the nacelle relative to a start position.
Each electrical contact is active at a plurality of first yaw rotation ranges with respect to the start position, and inactive at a plurality of second yaw rotation ranges with respect to the start position, the first and second yaw rotation ranges being interleaved.

20 Claims, 5 Drawing Sheets

(56) References Cited

U.S. PATENT DOCUMENTS

| | | | | |
|---|---|---|---|---|
| 5,422,826 | A * | 6/1995 | Cousineau | F03D 7/0204 |
| | | | | 700/287 |
| 7,855,469 | B2 * | 12/2010 | Stegemann | F03D 7/0292 |
| | | | | 290/55 |
| 2004/0165987 | A1 | 8/2004 | Wobben | |
| 2010/0209246 | A1 | 8/2010 | Migliori | |
| 2011/0133455 | A1 * | 6/2011 | Altenschulte | F03D 7/042 |
| | | | | 290/44 |
| 2011/0148112 | A1 * | 6/2011 | Ormel | F03D 17/00 |
| | | | | 290/44 |
| 2012/0133144 | A1 | 5/2012 | Barton et al. | |
| 2020/0271094 | A1 * | 8/2020 | Glavind | F03D 17/00 |

FOREIGN PATENT DOCUMENTS

| | | |
|---|---|---|
| CN | 103573561 A | 2/2014 |
| EP | 2333316 A2 | 6/2011 |
| EP | 2574782 A2 | 4/2013 |
| GN | 101915208 A | 12/2010 |
| GN | 102384027 A | 3/2012 |
| GN | 108463631 A | 8/2018 |
| WO | 2017137051 A1 | 8/2017 |

OTHER PUBLICATIONS

Danish Patent and Trademark Office 1st Technical Examination for Applicaton No. PA2016 70077 dated Aug. 29, 2016.
Patent Cooperation Treaty, International Search Report, for Application No. PCT/DK2017/050036 dated Jun. 21, 2017.
Dennis Horwitz: "Sensing the Motion", • Aug. 1, 2010 (Aug. 1, 2010), pp. 27-31, XP055378089, Retrieved from the Internet: URL:http://www.micronor.com/products/files Micronor Article Sensing The Motion-Rotary Positon Sensors-Electromechanical, Electronic aqnd Fiber Optic [PTE Aug. 2010]Micronor pp. 26-31—Copy.pdf [retrieved on Jun. 1, 2017] pp. 29,30 figures 6.7.

* cited by examiner

RELATING TO A YAW SENSOR FOR A WIND TURBINE

FIELD OF THE INVENTION

The present invention relates to a yaw sensor for a wind turbine.

BACKGROUND TO THE INVENTION

Wind turbines comprise a fixed tower which stands on the ground or sea bed, and a nacelle which rests on the top of the tower and carries a turbine shaft, a gearbox, a brake, a generator, a blade pitch controller which controls the angle of the turbine blades, and a yaw drive which controls the position of the wind turbine relative to the wind. Turbine blades are mounted to the turbine shaft externally of the nacelle. The turbine blades cause the shaft to rotate under the influence of wind, which in turn drives the generator to generate electrical power. The pitch of the blades is controlled by the blade pitch controller to influence the speed of rotation of the drive shaft in dependence on wind speed. The yaw drive causes the nacelle to slowly rotate at the top of the tower such that the turbine blades are facing into the direction of the prevailing wind, to maintain optimal power output. The yaw drive utilises a wind direction sensor to determine the current wind direction and a yaw sensor comprising an angular encoder which determines the current yaw position of the nacelle. The yaw drive comprises a controller which determines from the information gathered from these sensors a yaw adjustment to align the nacelle with the wind direction.

It will be appreciated that electricity generated from the generator in the nacelle is conveyed down the tower and to an electricity distribution system via an electric cable. It will be further appreciated that if the nacelle continues to rotate in the same direction continuously that eventually any slack in the electric cable will be used up and the electric cable would then snap if the nacelle rotates further. The yaw sensor consists of a signal, normally from an encoder, that provides the control system with information of nacelle orientation. To prevent cable over-twist, the control system stops yaw of the turbine at a given limited number of turns of nacelle revolutions. If a fail occurs in the control system, safety contacts are used to prevent cable over twist to avoid damage to the turbine (high voltages cables breaking). The contacts signals the yaw motors to stop. In order to achieve this, the yaw sensor comprises rotary cam switch, which is coupled to a gearbox of the yaw drive by a pinion gear, and which activates (or deactivates) an electrical contact when the drive of the cam switch has rotated to a predetermined (safe end stop) position in either direction from a central position.

It will be appreciated that a predetermined position of the cam switch will correspond to a predetermined yaw position (which can generally be expected to be a value of greater than 360°—that is, multiple rotations of the nacelle). For example, the nacelle may be able to safely rotate 10 times about the axis of its tower in either direction without damaging the electric cable, in which case the cam switch will activate (or deactivate) the electric contact at a cam position which corresponds to a yaw rotation of 3600° of the nacelle in either direction. In this example the cam switch may rotate once for 20 turns of the nacelle (that is, half a turn of the cam switch in each direction from a start position will activate (or deactivate) the electric contact. When the electrical contact is activated (or deactivated), this triggers the yaw drive to rotate the nacelle back in the opposite direction (by 10 turns in this example) to its central rest position or to make an emergency stop of the turbine pending maintenance to correct the problem.

The yaw sensor may be connected to a yaw bearing from the yaw drive by a pinion wheel, and the angular encoder may be connected to a shaft in the yaw sensor either directly or via a gear wheel. After the angular encoder, a gear may be provided before the cam switch. Accordingly, there are several transmissions which may potentially fail, either partly or completely, which might stop or at least inhibit the cam switch and/or the angular encoder from working. Safety regulations state that such all safety sensors and contacts must be activated once each year. However as the contacts are not activated under normal operation, but only used in case of a failure in the control system, they are usually never activated. Thus the contact functionality must then be checked by technical personnel, but this requires manual disassembly of the sensor, which introduces a potential risk of wrong assembly. Further, this process may be time consuming and costly.

It is against this background that the invention has been devised.

SUMMARY OF THE INVENTION

In a first aspect, the invention provides a yaw sensor for a wind turbine, the yaw sensor comprising:
 a plurality of rotary switches, each configured to be coupled to a yaw drive gearbox of a wind turbine nacelle, the rotary switches each being operable to activate and deactivate respective associated electrical contacts in dependence on an amount of yaw rotation of the nacelle relative to a start position;
 wherein each electrical contact is active at a plurality of first yaw rotation ranges with respect to the start position, and inactive at a plurality of second yaw rotation ranges with respect to the start position, the first and second yaw rotation ranges being interleaved, wherein the first yaw rotation ranges of the electrical contacts do not overlap each other between the start position and a first rotational position in a first rotational direction from the start position, and do not overlap each other between the start position and a second rotational position in a second rotational direction from the start position opposite to the first rotational direction, and wherein all of the electrical contacts are activated at the first rotational position and the second rotational position; and
 wherein the electrical contacts each generate a respective electrical signal when active.

The yaw sensor may comprise a controller operable to receive electrical signals from the electrical contacts and cause the yaw drive to stop rotating when electrical pulses are received simultaneously from two or more of the electrical contacts.

While two rotary switches can be used, it is preferred that three rotary switches are used, so that if one of the switches fails it is still possible for two of the rotary switches to activate their respective contacts to cause the yaw drive to stop rotating.

Each electrical contact may have the same number of first yaw rotation ranges, or alternatively two or more of the electrical contacts may have a different number of first yaw rotation ranges.

The controller may be operable to receive electrical signals from the electrical contacts and to estimate a current yaw rotation of the nacelle relative to the start position based on a sequence of pulses of the received electrical signals or gaps between pulses of the received electrical signals. The controller may be operable to estimate the current yaw rotation in dependence on an order in which pulses are received from different ones of the electrical contacts. The controller is operable to estimate the current yaw rotation in dependence on a current direction of rotation of the nacelle.

The yaw sensor may comprise an absolute encoder coupled to the yaw drive gearbox, the absolute encoder being operable to determine a current yaw position of the nacelle. The controller may be operable to compare the current yaw position determined by the absolute encoder with the estimated current yaw position. The controller may be operable to generate a validation signal in dependence on whether the current yaw position determined by the absolute encoder substantially matches the current yaw position estimated based on the rotary switch.

A pattern of first and second yaw rotation ranges in a first direction of rotation with respect to the start position may be different to a pattern of first and second yaw rotation ranges in a second, opposite, direction of rotation with respect to the first position for at least one of the rotary switches. In this case, the controller may be operable to determine a direction in which the nacelle is rotating based on an order of occurrence of two or more received pulses of electrical signals from one or more of the electrical contacts.

The first rotational position may be a plurality of rotations of the nacelle in a first rotational direction with respect to the start position and the second rotational position may be a plurality of rotations of the nacelle in a second rotational direction with respect to the start position. The first and second rotational positions may be proximate safe end stop positions of the nacelle.

In a second aspect, the invention provides a yaw drive for a wind turbine comprising a yaw sensor as described above.

In a third aspect, the invention provides a wind turbine comprising a yaw sensor as described above.

DETAILED DESCRIPTION OF EMBODIMENTS OF THE INVENTION

Figure 1:
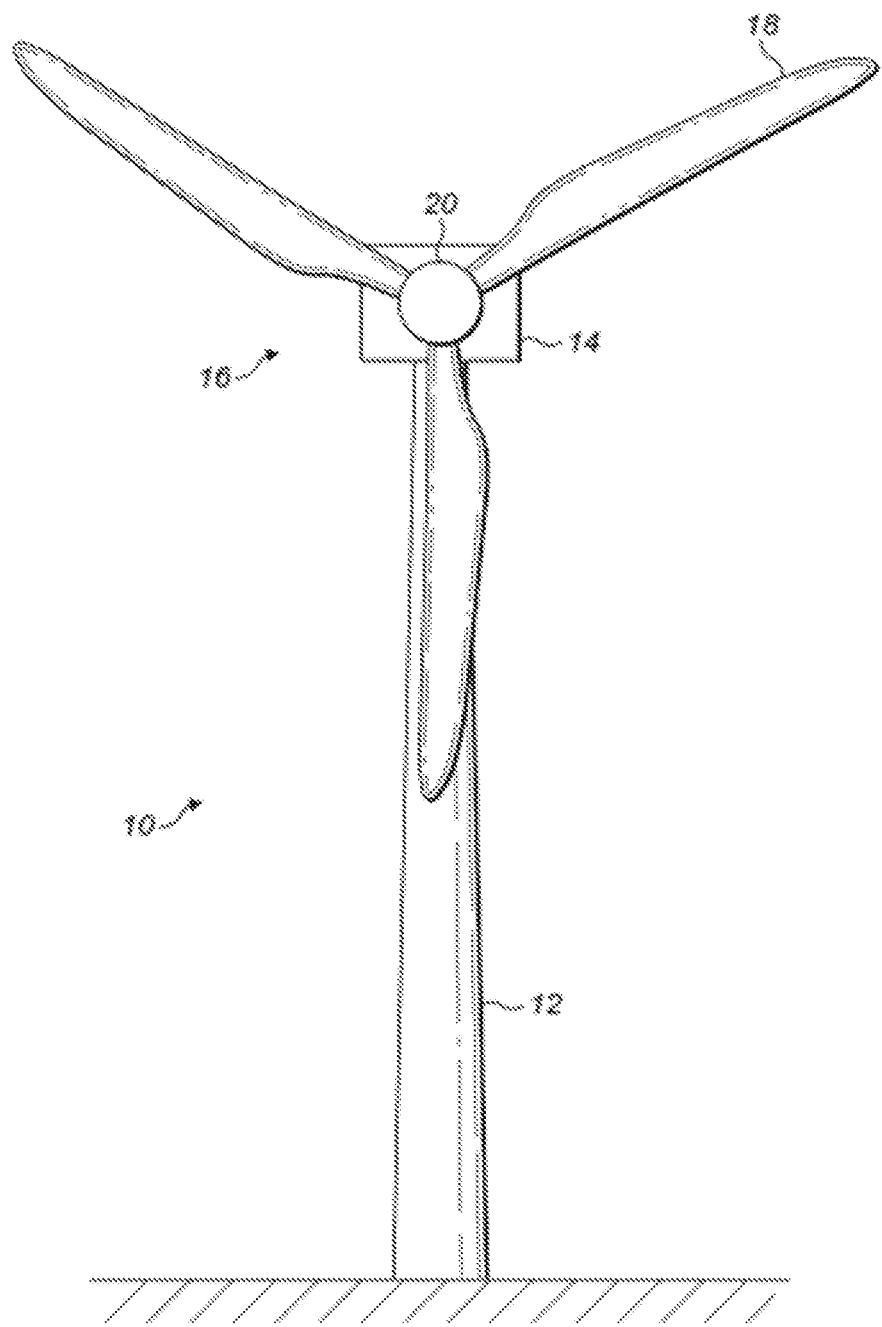
FIG. 1 is a schematic view of a wind turbine system.

FIG. 1 shows a wind turbine 10 comprising a tower 12 supporting a nacelle 14 to which a rotor 16 is mounted. The rotor 16 comprises a plurality of wind turbine blades 18 that extend radially from a central hub 20. In this example, the rotor 16 comprises three blades 18. As discussed above, the pitch of the wind turbine blades 18 can be adjusted by a blade pitch controller (not shown), while the yaw of the nacelle 14 can be adjusted by a yaw drive (not shown) to face generally into the wind.

Figure 2:
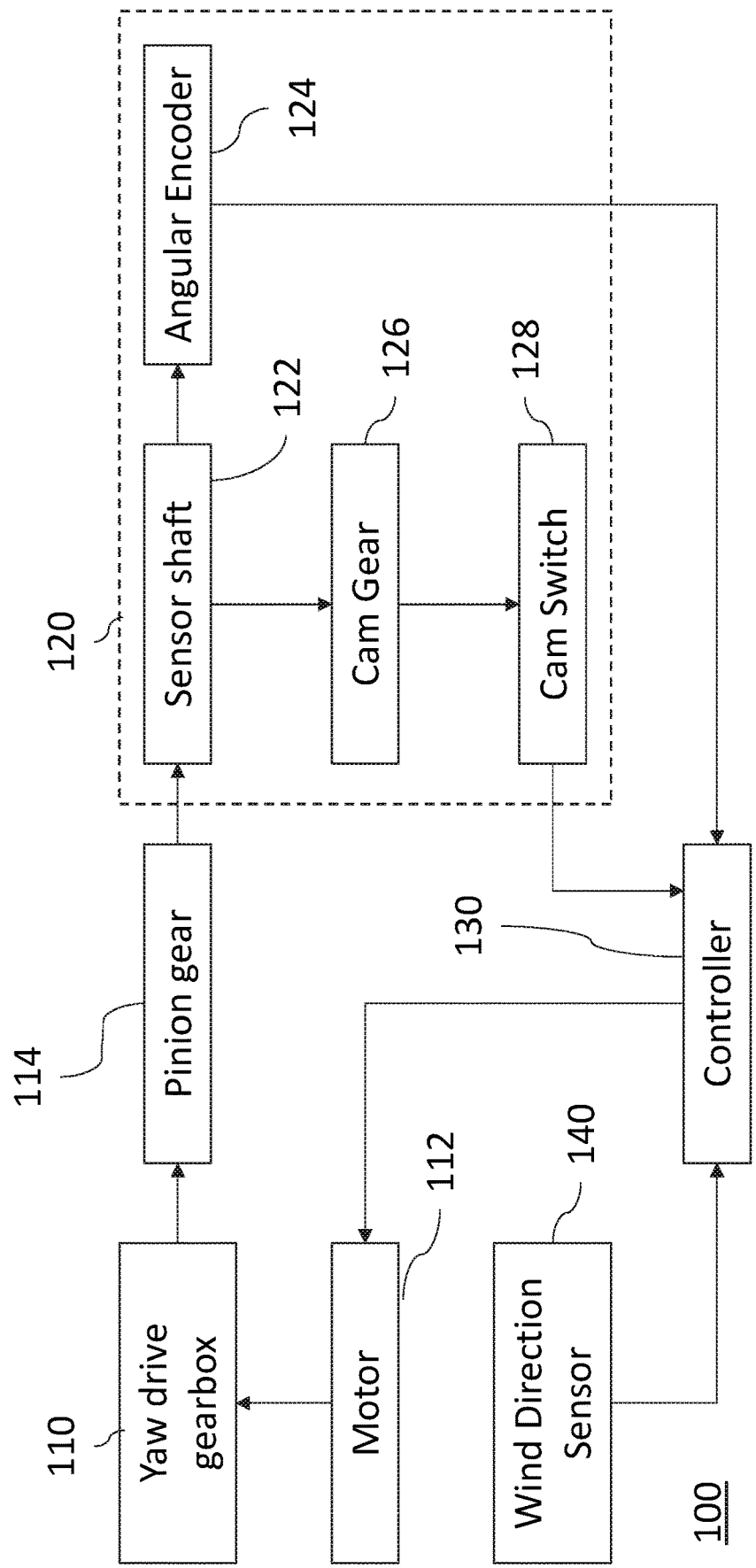
FIG. 2 is a schematic functional diagram of a yaw drive and sensor.

FIG. 2 shows the functional components and interrelationships of a yaw drive 100. The yaw drive 100 comprises a yaw drive gearbox 110 which is connected on the one hand to a rotating mount (not shown) on which the nacelle 14 is disposed, and on the other hand to a motor 112 which rotates a shaft for driving the rotation of the rotating mount via the gearbox 110. A yaw sensor 120 is provided, which is coupled to the yaw drive gearbox 110 (for example the yaw bearing) by way of a pinion gear 114. The yaw sensor comprises an angular (absolute) encoder 124 and a mechanical cam switch 128. As the nacelle 14 is rotated by the action of the motor 112 and the gearbox 110, the pinion gear 114 also rotates, and the rotation of the pinion gear 114 in turn rotates a sensor shaft 122 of the yaw sensor 120. The angular encoder 124 is coupled to the sensor shaft 122, either directly or by way of another gear (not shown), and is able to track the rotation of the shaft and output a signal indicative of the current rotational position of the nacelle 14. The cam switch 128 is also coupled to the sensor shaft 122, in this case by way of a cam gear 126. It will be appreciated that if the pinion gear 114 fails, neither the absolute encoder 124 nor the cam switch 128 will function. Moreover, if the coupling between the angular encoder 124 and the sensor shaft 122 fails, the angular encoder 124 will not function, but the cam switch 128 should still function, while if the cam gear 126 fails then the cam switch 128 will not function but the angular encoder 124 should still function. In other words, there are a number of transmission components which may potentially fail.

A controller 130 is provided which controls the yaw drive by switching the motor 112 on and off (and setting its direction of rotation, to permit rotation of the nacelle 14 in either direction). The controller 130 receives an indication of current wind direction from a wind direction sensor 140, and also receives a current yaw position of the nacelle 14 from the angular encoder 124. The controller 130 is able to determine what adjustments, if any, are required to the yaw of the nacelle 14 in order to face the turbine blades 18 into the wind. This can be determined based on a measured relative wind direction. If adjustment is required then the controller 130 controls the motor 112 to rotate the nacelle 114 by a predetermined amount to give effect to the adjustment. Generally, the speed of rotation can be expected to be fixed, and a desired amount of rotation is achieved by switching the motor 112 on for a period of time which will result in rotation by that desired amount. In other words, for a fixed speed of rotation and a known motor activation duration, an amount of rotation of the nacelle obtained is substantially predictable. The yaw (nacelle) position as determined by the angular encoder 124 may be used to give an absolute wind direction which can be used to determine if the wind is coming from a direction which should cause the turbine to be derated or shut down. It is also used for determining the yawing speed. In addition to the yaw position indicated by the angular encoder 124, the cam switch 128 also provides one or more signals to the controller 130.

The cam switch 128 may be of a structurally conventional nature, with electrical contacts which are opened and closed by round disks, or "cams". The cams are provided with either notches or fingers which allow the contacts to be activated (switch closed to permit a flow of electricity) and deactivated (switch opened to inhibit a flow of electricity) at desired rotational positions of the cam. A spring bias may be used to bias a following member against the cam, with the following member holding the contact closed wherever the cam is notched and the member drops down into the notch, and holding the contact open wherever it is not notched. It will be appreciated that the opposite could apply, with the contact being open whenever the cam is notched, and closed whenever it is not notched. Similarly, where fingers are used instead of notches then the following member will be urged away from the axis of the cam whenever it encounters a finger. More generally, the cam may have (relatively) raised and lowered circumferential portions, with switching of the contacts being controlled as the following member encounters and follows the raised and lowered circumferential portions. The cam switch 128 may comprise a plurality of cams, all co-mounted to the same shaft and having raised and lowered circumferential portions at desired locations, and controlling its own independent contact based on the position of the raised and lowered circumferential portions.

In the context of the present technique, a position of a raised (or lowered) circumferential portion on a particular cam can be set to activate or deactivate a contact at a desired rotational position of the cam (and thus of the nacelle 14, which is coupled to a shaft of the cam switch 128 via the pinion gear 114, sensor shaft 122 and cam gear 126). It will be appreciated that, in view of the fact that a single rotation of the cam may correspond to multiple rotations of the nacelle 14, the rotational position of the nacelle 14 at which the cam switch activates or deactivates may be greater than 360°. Similarly, a length of a raised or lowered portion on the cam can be set to correspond to a particular angular range of the cam (and thus of the nacelle 14). One of the cams may comprise a single notch or finger which is positioned to correspond to a safe stop position of the nacelle 14 (for example 10 rotations of the nacelle 14 in each direction). In this case, a start position of the cam, corresponding to a start position of the nacelle 14, may be at the opposite side of the cam from the notch or finger, and a half rotation of the cam (to reach the notch or finger from the start position) will correspond to the number of rotations (full or partial) which the nacelle 14 can turn safely in either direction. If for example the nacelle 14 can rotate about the axis of the tower 12 a maximum of 10 times safely, then each rotation of the nacelle 14 in a particular direction will rotate the cam 10% of the way from the cam start position towards the notch or finger. Whichever direction the nacelle 14 turns, the cam will reach the notch or finger after 10 turns from its start position, which will cause an electrical signal to be generated by the contact of the cam switch 128 and be provided to the controller 130 as a safe end stop signal. The controller 130 is responsive to this safe end stop signal to inhibit further rotation of the nacelle 14 in that direction, and/or to rotate the nacelle 14 (and thus the cam) back to its start position.

Figure 3:
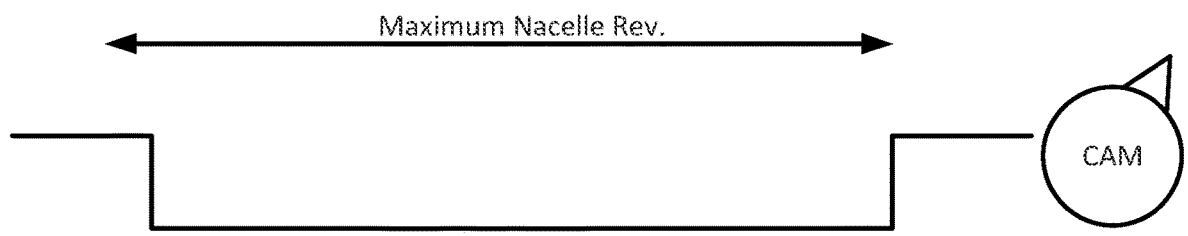
FIG. 3 is a schematic view of a prior art cam switch.

The cam may also comprise one or more raised and lowered portions distributed about its circumference which cause a contact to be activated and deactivated as the nacelle 14 (and thus the cam) rotates. The activation and deactivation of this contact generates a signal which can be provided to the controller 130 to indicate that the cam switch 128 is still functioning. In particular, the controller 130 knows that the nacelle 14 is rotating based on either or both of the fact that it is triggering the motor 112 to drive rotation of the nacelle 14 and based also on the signal received from the angular encoder 124. If the signal received from the cam switch 128 does not vary as the nacelle 14 rotates, the controller is able to infer a problem with either the cam switch, or the transmission chain between the gearbox 110 and the cam switch 128. In this case, the controller 130 cannot safely rely on the safe end stop signal from the cam switch 128, and may inhibit the yaw drive from rotating the nacelle 14 until the problem has been rectified by an engineer. Conventionally, a cam disk is arranged such that it closes a contact at a point on the cam disk, then there is a gearing that fits to the yaw ring and is selected such it provides an end stop at a given limit corresponding to a number of nacelle revolutions, as discussed above. However with such a design, the contacts are only activated in the event of a failure in the control system. So a manual function check is required. An example of such a conventional cam switch is shown in FIG. 3. Here, a single pin on a cam triggers an end stop position in either direction from a start position, defining a maximum number of nacelle revolutions allowed.

Figure 4:
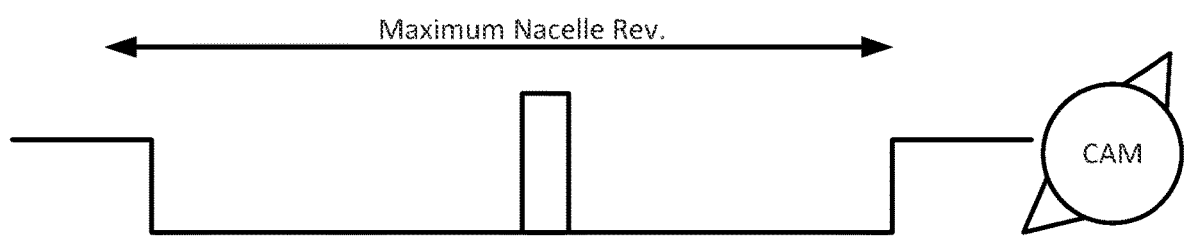
FIG. 4 is a schematic view of a modified cam switch.
Figure 5:
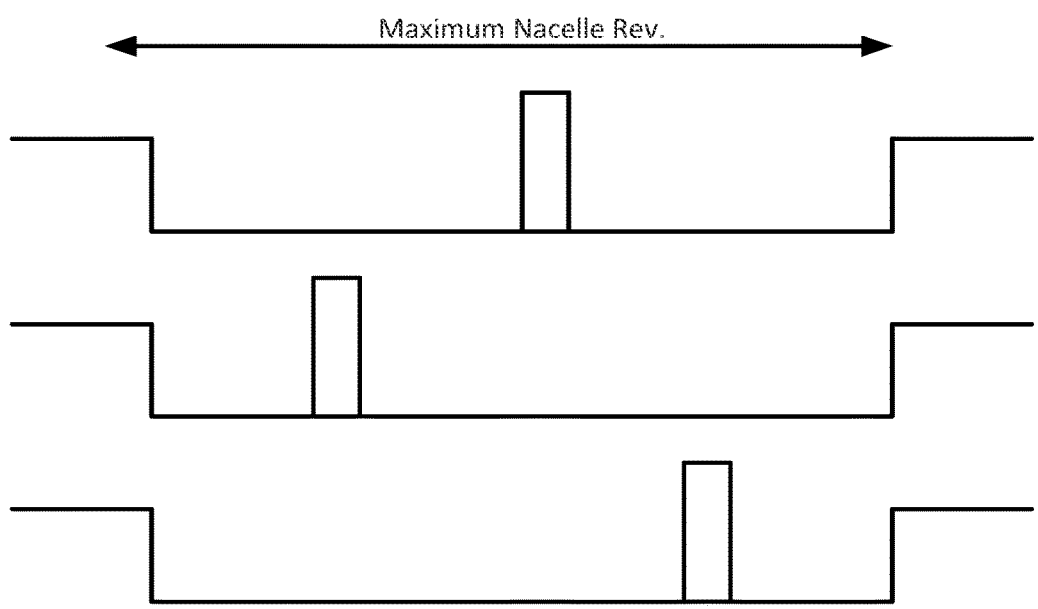
FIG. 5 is a schematic view of a set of modified cam switches.

Referring now to FIG. 4, an extra "pin" (or equivalent formation as described above) on the cam is provided, which can be activated during normal operation (rather than only being activated in an emergency stop situation as is the case with FIG. 3). This additional pin will then activate the contact and fulfil the safety system requirement under normal operation. It will be understood that the pin will coincide with the contact at some point between the start position and one of the end stop positions. It will be appreciated that it is necessary to distinguish between the activation of the contact during normal operation, and the activation of the contact to trigger an end stop condition. This is achieved by providing one or more extra cams of the same function and construction, but with their additional pins occurring at different rotational positions with respect to each other, as shown in FIG. 5. In addition, there is a requirement that the end stop condition (to stop the yaw motor) is only triggered when two or more of the contacts are activated at the same time. However, to provide the same safety level as for one contact, at least 3 cams (and contacts) are needed, as shown in FIG. 5. This is because, if only 2 cams (and contacts) are provided, the failure of a single contact will make triggering of the end stop condition impossible, but the likelihood of one of two cams (and contacts) failing is higher than the likelihood of a single cam or contact failing. Referring to FIG. 5, it can be seen that at the end stop positions to either side of the diagram, all three signals will transition to a "high" state indicating that the respective contacts are active. Since in this case the requirement that at least two contacts are active is met, the end stop condition is satisfied. However, as a nacelle rotates in either direction within its normal range (that is, between the end stop positions), it can be expected to trigger at least one of the additional pins. Within the central region of the rotational range of the nacelle, the top cam contact shown in FIG. 5 will be activated. In a normal operating region in one direction, the middle cam contact shown in FIG. 5 will be activated. In a normal operating region in the opposite direction, the bottom cam contact shown in FIG. 5 will be activated. However, within the normal operating region, only one of the three contacts will be activated at a time, such that the end stop condition will not be met.

Figure 6:
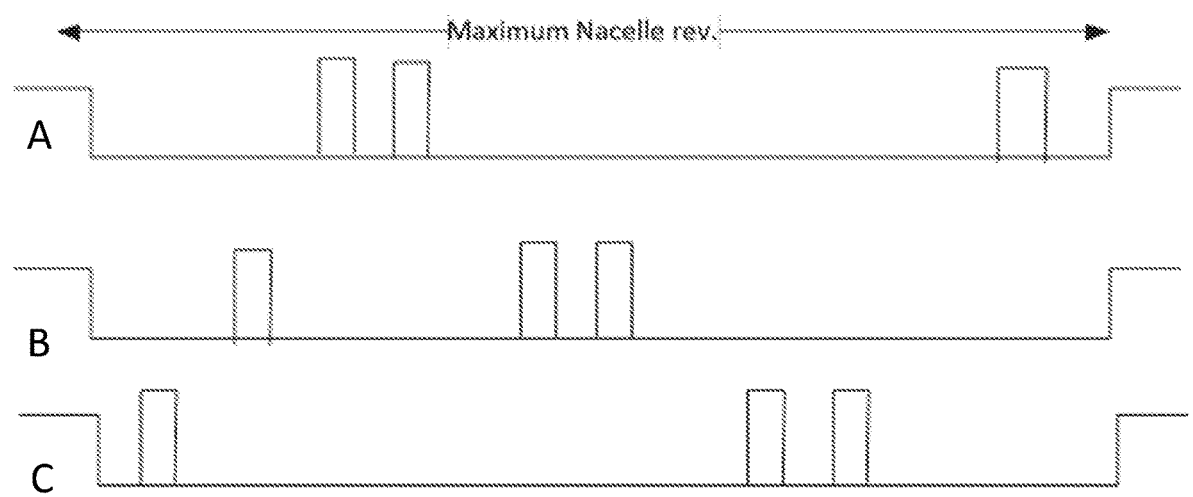
FIG. 6 is a schematic view of a further set of modified cam switches.

Referring to FIG. 6, further pins can be added to each cam to implement yaw sensor supervision. It can be seen that each of three cams A, B, C have a plurality of pins at different positions within the normal rotational range of the nacelle. As the nacelle rotates, a particular sequence of contacts will be triggered. Starting from the left hand side and moving right, it can be seen that a sequence of C, B, A, A, B, B, C, C, A contacts will be triggered. Since each of the pins of each cam correspond to a predetermined rotational position of the nacelle, by observing a transition of pulses from the same or different contacts, that rotational position can be estimated. For example, a transition from A to B indicates a rotational position near the central start position, while a transition from C to A indicates a rotational position near the right hand side of FIG. 5. The estimated rotational position can be checked against a rotational position measured by the angular encoder, and in the case of a mismatch an error signal can be generated. It will be noted that none of the additional pins/pulses in FIG. 5 occur at the same time on multiple cams (since this would trigger an end stop condition).

Figure 7:
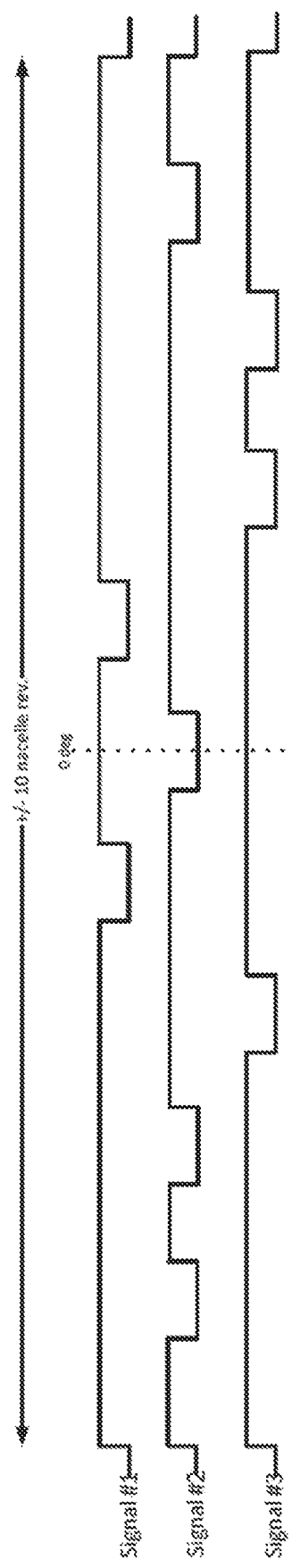
FIG. 7 is a schematic view of a further set of modified cam switches.

Referring to FIG. 7, a further example of how yaw sensor supervision can be achieved is illustrated. In FIG. 7, pulses are indicated by low signal values. In FIG. 7, again 3 cams and contacts are provided, giving rise to three signals signal #1, signal #2 and signal #3. It can be seen that signal #1 (top) comprises two pulses in addition to the end stop pulses. The two pulses are disposed symmetrically with respect to the start (central) position of the nacelle. The signal #2 comprises four pulses in addition to the stop end pulses. The four pulses are disposed asymmetrically with respect to the start position of the nacelle. The signal #3 comprises three pulses in addition to the stop end pulses. The three pulses are disposed asymmetrically with respect to the start position of the nacelle. As with FIG. 6, none of the pulses (except the stop end pulses) will be generated concurrently, so as not to erroneously give rise to a stop end condition. With this arrangement, the order in which pulses are generated on the signals #1, #2 and #3 will inform both the direction of rotation and an estimate of the current rotational position of the nacelle.

It will be appreciated from FIGS. 5, 6 and 7 that it is possible to estimate the yaw of the nacelle 14 by determining an order in which pulses (or gaps between pulses) arrive from the same or different ones of the contacts. It should be noted that these signals are digital, indicating either that the contact is currently active or inactive. They do not in themselves indicate the current rotational position of the cam (or of the nacelle 14). The controller 130 is aware of the correspondence between pulse sequence and angular distance from the start position of the nacelle 14 (in each rotational direction), and therefore is able to infer an estimate of the yaw position from the observed pulse transitions.

It will be appreciated that the nacelle 14 may oscillate in both rotational directions to track the wind direction. The rotational position associated with a given pulse may depend on the direction from which that pulse is approached. This is because each pulse has a finite length, and what will be the leading edge of the pulse when approached from a first direction will the trailing edge of the pulse when approached from the opposite direction.

The controller 130 is able to compare the yaw position estimated in this way from the cam switch pulses with the yaw position measured by the rotary encoder 124, to supervise if the encoder yaw position signal is valid and verify the absolute position of the nacelle 14. In the case of a discrepancy, the yaw drive can be inhibited from further rotating the nacelle 14 until an engineer has corrected the problem (which could be a problem with either or both of the rotary encoder 124 and the cam switch 128, or with the transmission components). A validation signal (or error signal) can be generated to confirm that the encoder yaw position is valid, or in the alternative to indicate that there is a discrepancy between the encoder yaw position and the cam switch yaw position.

If necessary, the yaw pulse generated by the cam switch 128 can also be used to define a reset point. More particularly, a position to which the nacelle 14 returns to on reset (when it has reached one or other of the safe stop points) can be defined and controlled using the yaw pulse. In particular, the controller 130 may rotate the nacelle 14 back from the safe stop point until the cam switch 128 generates a pulse transition which corresponds to the desired nacelle 14 position.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A yaw sensor for a wind turbine, the yaw sensor comprising:
   a plurality of rotary switches, each configured to be coupled to a yaw drive gearbox of a wind turbine nacelle, the plurality of rotary switches each being operable to rotate respective associated electrical contacts to activate and deactivate in dependence on an amount of yaw rotation of the nacelle between a start position and a first rotational position as a first predetermined point for rotation in a first rotational direction from the start position and between the start position and a second rotational position as a second predetermined point for rotation in a second rotational direction from the start position;
   wherein a plurality of first yaw rotation ranges are defined between the start position and the first rotational position and between the start position and the second rotational position;
   wherein a plurality of second yaw rotation ranges are defined between the start position and the first rotational position and between the start position and the second rotational position;
   wherein the plurality of first yaw rotation ranges do not overlap each other, and are interleaved with the plurality of second yaw rotation ranges;
   wherein each electrical contact is active at the plurality of first yaw rotation ranges and inactive at the plurality of second yaw rotation ranges;
   wherein all of the electrical contacts are activated at the first rotational position and the second rotational position; and
   wherein the electrical contacts each generate a respective electrical signal when active.

2. The yaw sensor according to claim 1, further comprising a controller operable to receive electrical signals from the electrical contacts and cause the yaw drive gearbox to stop rotating when electrical pulses are received simultaneously from two or more of the electrical contacts.

3. The yaw sensor according to claim 1, wherein the plurality of rotary switches consists of three switches.

4. The yaw sensor according to claim 1, wherein each electrical contact has the same number of first yaw rotation ranges.

5. The yaw sensor according to claim 1, wherein two or more of the electrical contacts have a different number of first yaw rotation ranges.

6. The yaw sensor according to claim 1, further comprising a controller operable to receive electrical signals from the electrical contacts and to estimate a current yaw rotation of the nacelle relative to the start position based on a sequence of pulses of the received electrical signals or gaps between pulses of the received electrical signals.

7. The yaw sensor according to claim 6, wherein the controller is further operable to estimate the current yaw rotation in dependence on an order in which the pulses are received from different ones of the electrical contacts.

8. The yaw sensor according to claim 7, wherein the controller is further operable to estimate the current yaw rotation in dependence on a current direction of rotation of the nacelle.

9. The yaw sensor according to claim 6, further comprising an absolute encoder coupled to the yaw drive gearbox, the absolute encoder being operable to determine a current yaw position of the nacelle;
wherein the controller is operable to compare the current yaw position determined by the absolute encoder with the estimated current yaw position.

10. The yaw sensor according to claim 9, wherein the controller is further operable to generate a validation signal in dependence on whether the current yaw position determined by the absolute encoder substantially matches the current yaw position estimated based on the rotary switch.

11. The yaw sensor according to claim 1, wherein a first pattern of first and second yaw rotation ranges in the first rotational direction with respect to the start position is different to a second pattern of first and second yaw rotation ranges in the second rotational direction for at least one of the rotary switches.

12. The yaw sensor according to claim 6, wherein the controller is further operable to determine a direction in which the nacelle is rotating based on an order of occurrence of two or more received pulses of electrical signals from one or more of the electrical contacts.

13. The yaw sensor according to claim 1, wherein the first rotational position is a plurality of rotations of the nacelle in the first rotational direction with respect to the start position and the second rotational position is a plurality of rotations of the nacelle in the second rotational direction with respect to the start position.

14. The yaw sensor according to claim 1, wherein the first rotational position and the second rotational position are proximate safe end stop positions of the nacelle.

15. An apparatus, comprising:
a yaw drive gearbox for a wind turbine including a nacelle; and
a yaw sensor comprising a plurality of rotary switches, each rotary switch of the plurality of rotary switches configured to be coupled to the yaw drive gearbox and to rotate respective associated electrical contacts to activate and deactivate in dependence on an amount of yaw rotation of the nacelle relative to a start position and a first rotational position as a first predetermined point for rotation in a first rotational direction from the start position and between the start position and a second rotational position as a second predetermined point for rotation in a second rotational direction from the start position;
wherein a plurality of first yaw rotation ranges are defined between the start position and the first rotational position and between the start position and the second rotational position;
wherein a plurality of second yaw rotation ranges are defined between the start position and the first rotational position and between the start position and the second rotational position;
wherein the plurality of first yaw rotation ranges do not overlap each other, and are interleaved with the plurality of second yaw rotation ranges;
wherein each electrical contact is active at the plurality of first yaw rotation ranges and inactive at the plurality of second yaw rotation ranges;
wherein all of the electrical contacts are activated at the first rotational position and the second rotational position; and
wherein the electrical contacts each generate a respective electrical signal when active.

16. The apparatus according to claim 15, further comprising a controller operable to receive electrical signals from the electrical contacts and cause the yaw drive gearbox to stop rotating when electrical pulses are received simultaneously from two or more of the electrical contacts.

17. The apparatus according to claim 15, further comprising a controller operable to receive electrical signals from the electrical contacts and to estimate a current yaw rotation of the nacelle relative to the start position based on a sequence of pulses of the received electrical signals or gaps between pulses of the received electrical signals.

18. The apparatus according to claim 17, wherein the controller is further operable to estimate the current yaw rotation in dependence on an order in which pulses are received from different ones of the electrical contacts.

19. A wind turbine, comprising:
a tower;
a nacelle disposed on the tower;
a yaw drive gearbox disposed in the nacelle; and
a yaw sensor comprising a plurality of rotary switches, each rotary switch of the plurality of rotary switches configured to be coupled to the yaw drive gearbox and to rotate respective associated electrical contacts to activate and deactivate in dependence on an amount of yaw rotation of the nacelle relative to a start position and a first predetermined rotational position in a first rotational direction or a second predetermined rotational position in a second rotational direction opposite to the first rotational direction;
wherein a plurality of first yaw rotation ranges are defined between the start position and the first predetermined rotational position and between the start position and the second predetermined rotational position;
wherein a plurality of second yaw rotation ranges are defined between the start position and the first predetermined rotational position and between the start position and the second predetermined rotational position;
wherein the plurality of first yaw rotation ranges do not overlap each other, and are interleaved with the plurality of second yaw rotation ranges;
wherein each electrical contact is active at the plurality of first yaw rotation ranges and inactive at the plurality of second yaw rotation ranges;
wherein all of the electrical contacts are activated at the first predetermined rotational position and the second predetermined rotational position; and
wherein the electrical contacts each generate a respective electrical signal when active.

20. The wind turbine according to claim 19, further comprising a controller operable to receive electrical signals from the electrical contacts and cause the yaw drive gearbox to stop rotating when electrical pulses are received simultaneously from two or more of the electrical contacts.

* * * * *